Aug. 18, 1942.　　　T. D. SHANKEL　　　2,293,668
GRAIN CLEANER
Filed Dec. 11, 1940
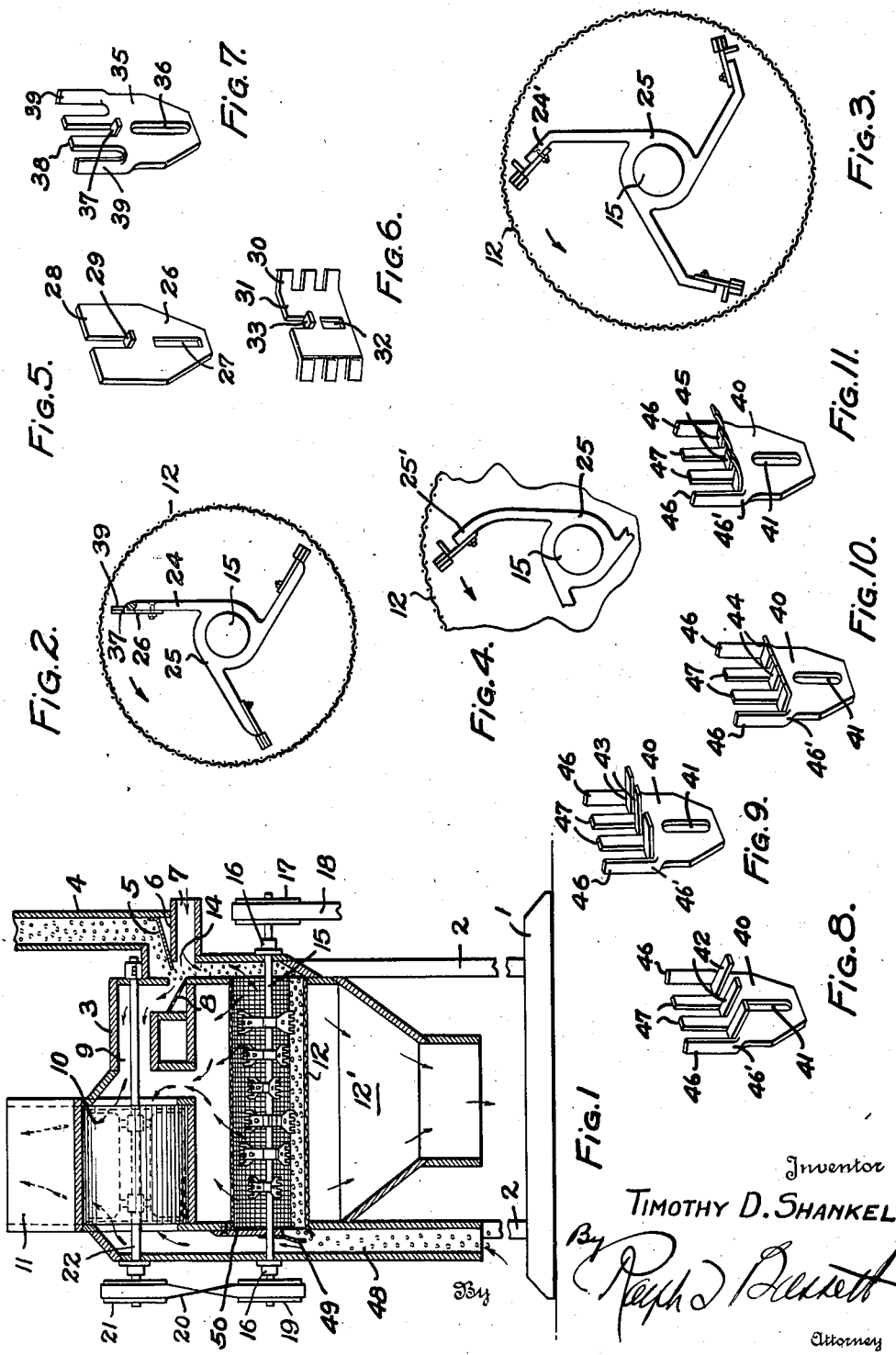
Inventor
TIMOTHY D. SHANKEL.
By Ralph D. Bessett
Attorney Patented Aug. 18, 1942

2,293,668

UNITED STATES PATENT OFFICE 2,293,668

GRAIN CLEANER

Timothy D. Shankel, Bristol, Va.

Application December 11, 1940, Serial No. 369,667

4 Claims. (Cl. 83—30)

This invention is a continuation in part of my application Serial No. 228,209, and relates to improvements in grain cleaners and particularly to that type of apparatus designed for the removal of dirt, chaff and smut balls from wheat and other grain, in order that the grain may be properly conditioned for milling.

The main object of the present invention is to provide a machine capable of the functions designated at a minimum of expense due to power consumption and which in its operation will not clog or stall when overloaded.

Another object of this invention is to provide a machine which will break up and remove smut balls without breaking or injuring the whole wheat grains and thereby impair their market value for the purpose specified.

The invention further comprehends a structure in which the operating blades are set at a definite angle with respect to the counter-clockwise driven hub and the cylinder in which the hub is positioned, whereby the movement of the grain and its projection against the screen is accomplished with a minimum of power.

A further object of the invention is to provide fingers of definite construction to facilitate a swirling action of the grain essential in removing smut.

The invention further provides a scourer interposed between the inlet and outlet, which scourer incorporates the use of specially designed blades which are adjustably arranged and interchangeably secured to provide means for projecting the grain against the cylinder for cleaning the same rather than accomplishing this result by a rubbing action which tends to mutilate the grain structure.

Other objects will more clearly hereinafter appear by reference to the accompanying drawing forming a part of the specification and wherein like characters of reference designate corresponding parts throughout the several views in which:

Fig. 1 is a vertical section through the machine.

Fig. 2 is a transverse section through the scouring cylinder.

Fig. 3 is a view similar to Fig. 2 showing a modified form of blade carrying arm.

Fig. 4 is a fragmentary view similar to Figs. 2 and 3 illustrating a further modification of the blade carrying arm, and Figs. 5, 6, 7, 8, 9, 10 and 11 are modifications of various forms of blades, the use of which comprise features of the present application.

In the drawing the base is indicated at 1 and this base has vertically extending uprights 2 which are suitably secured to the apparatus comprising the subject-matter of the invention. The apparatus comprehends a casing 3 of irregular form provided with a vertically arranged inlet 4 discharging upon the flat inclined spreader or deflector 5. The deflector 5 is secured to the vertical outer wall of the inlet and rests at its lower inner end upon the top wall 6 of the air inlet 7. The air inlet 7 is arranged immediately below the grain inlet 4 and the path of air travel intercepts the flow of grain from the spreader or deflector 5 and conveys the dirt and loose chaff upwardly over the inclined deflector 8 through the passageway 9 and into the blower 10 from which it is discharged through the blower outlet 11. From the inlet 4 the grain passes as previously stated across the air currents from the air inlet 7 and into the cylinder screen 12. The screen 12 may be of any desired form and constructed of any suitable mesh which will facilitate the discharge of dirt, chaff and smut which escape the flow of air intersecting the grain and indicated by reference character 14.

A transverse shaft 15 is mounted in the bearing 16 and driven by pulley 17 and belt 18 connected with a desirable source of power. The shaft 15 is driven counter-clockwise from the drive belt 18. The shaft, as shown, extends through both ends of the casing 3 and the drive pulley is mounted on one end of the shaft outside of the casing. A pulley 19 is mounted on the opposite end of the shaft 15 and through belt 20 and pulley 21 drives the blower 10 mounted on the shaft 22 in the blowing chamber. By the conventional method of reversing the belt the blower 10 can be driven in the clockwise direction as is conventional in such assemblies.

Extending from the shaft 15 are a plurality of blade carrying arms 24, mounted circumferentially in series and tangentially of the hub structure 25. Any desired number of these hubs, each with a suitable number of arms 24, and extending tangentially of the hub or concentrically of the axis of the shaft 15 may be provided. In Fig. 2 the arms 24 are illustrated as tangentially of the hub 25 and comprise rigid straight members which terminate inward of the inner face of the screen 12. In Figs. 3 and 4 these arms are modified by having their extremities 24' and 25' bent forwardly in the direction of their movement at their extremities or in a counterclockwise direction to provide inclined plate receiving elements.

The relative angle of the extremities of the arms shown in Figs. 3 and 4 has a definite relation with respect to the inner cylinder surface, the purpose being to effect a scooping or picking up of the grain by the plates which are carried by the arms while in their counter-clockwise movement in a manner to prevent packing of the grain between the blades and the cylinder and in addition to create a maximum impact between the grain and the cylinder whereby the grain is caused to bounce or roll on the screen for the cleaning operation. In Fig. 3 the extremities 24' are bent at a suitable angle to accomplish the desired result while in Fig. 4 the outer portion 25' of the arms are forwardly bent or curved to accomplish the same result.

The hubs 25 carrying the arms may be secured to the shaft by any suitable means and the number of such assemblies will be determined by the nature of the operation involved and to which the machine is to be subjected. The arms are shown as cast integral with the hub but this arrangement is a matter of choice it being obvious to those skilled in the art that these arms may be separate from the hub and attached thereto by suitable means. The hubs are capable of adjustment both axially and circumferentially and thus the blades carried by the hubs may be arranged with relation to each other, i. e. in axial alignment or spirally as desired.

Figs. 5 to 11 disclose various types of scouring blades. In Fig. 5 a plate is shown merely including the tapered lower portion 26 provided with vertically formed elongated slot 27, and an upper bifurcated portion 28, the latter having an intermediate section 29 struck therefrom and bent at right angles. In Fig. 6 the short fingers 30 extend laterally from the intermediate plate portion 31 and are angularly bent in opposite directions as shown. The plate 31 is provided with elongated slot 32 for securing the same to the arms 24, 24' and 25' and in addition has the central vertical portion 33 struck therefrom and bent downwardly at right angles to the main body. In Fig. 7 the plate body includes the lower securing portion 35 having slot 36 to facilitate its attachment to the arms and vertically extending fingers as shown. It will be noted that the fingers illustrated as five in number, the intermediate fingers 37 being bent downwardly at right angles to the main body portion, the adjacent fingers 38 being in a common plane with the main body portion while the end fingers 39 are distorted by being bent at their junction with the main plate body to cause them to be positioned at an angle substantially 90 degrees with respect to and at opposite sides of the fingers 38.

In Figs. 8, 9, 10 and 11 the scouring plate structures each embody the lower attaching portion 40 formed with vertically extending centrally positioned elongated slot 41 used in attaching the same to the arms 24, 24' and 25' by means of the bolts as shown. The same fastening means is utilized in each instance, the method of fastening being a matter of choice provided the plates are firmly secured in an adjustable manner against dislodgment or misalignment during operation of the device. In Figs. 8, 9, 10 and 11 the upper portion of the scouring plates are shown as being cut vertically to provide a multiplicity of fingers of uniform dimensions, although this latter feature may not be essential to the successful operation of the device. As shown the fingers are of elongated form and while flat are relatively narrow in width. The alternate intermediate fingers are bent downwardly in the modifications contained in Figs. 8 to 11 inclusive and to varying positions. In Fig. 8 the alternate intermediate fingers are bent forwardly at substantially right angle to the interposed structure. In Fig. 9 this angle is modified, while in Figs. 10 and 11 the corresponding fingers are shown as bent at their junction with the plate and then curved upwardly. In Fig. 8 in which the fingers are bent at right angles they are represented by reference characters 42. In Fig. 9 in which the angular position of the fingers is less marked than in Fig. 8, they are represented by reference character 43. In Fig. 10 the outer extremities of the fingers are curved or bent upwardly slightly and in this modification the fingers are indicated at 44. Reference character 45 represents the fingers shown in Fig. 11. In this figure the fingers are curved substantially throughout their entire structure. The structure and position of the intermediate fingers 42, 43, 44 and 45 may be modified in accordance with the nature of the grain or other material being treated in the machine to secure the maximum efficiency of the device. One of the most important features of the blade structure in Figs. 8, 9, 10 and 11 is that the outer fingers 46' are bent or twisted at their base so as to be positioned at an angle substantially 90 degrees to the vertical intermediate fingers indicated by reference characters 47.

From the foregoing certain structural features will appear as of paramount importance and these features include the deflector 5 which spreads the grain passing through the said opening 4 into a relatively flat stream so that air flowing through the fresh air intake 7 will intercept and carry with it some of the light foreign material and discharge the same through the blower outlet. The cylinder 12 which is preferably made of perforated metal of desirable form might be made of hardware, cloth or other suitable material, it being merely essential that the structure be suitable to render proper service and permit the dirt to pass through and at the same time retain the grain for its discharge through the opening 48.

The preferable arrangement of the scourers is a spiral formation in the longitudinal direction, i. e., the direction of the cylinder, this arrangement providing a maximum propeller effect, and an even distribution of the grain as it impinges on the inside of the cylindrical screen. It will be noted that the discharge outlet controlling the cylinder includes the plate 49 which is deflected outwardly above a lower spout or spreader plate and is carried by the transverse panel 50 fixed to the frame 3.

The operation of the device is as follows: The grain to be cleaned passes through the spout 4 across the air jet entering transverse ports 7, this air jet providing preliminary cleaning, which operation removes chaff, dirt and other light loose material. The grain after passing across the jet from the port 7 enters the cylinder 12 in which the shaft 15 is journalled. This shaft has mounted on it arms tangents supported on hubs as shown in Figs. 2, 3 and 4. The ends of the shafts are provided with scouring blades preferably of the type shown in Figs. 8, 9, 10 and 11 and these blades are rotated in counter-clockwise direction by power driven from a suitable source through the belt 18. This same source of power is utilized in driving the blower 10 for removing and discharging of the chaff and dirt travelling from the preliminary cleaning stage at 14. The blades on the ends of the arms 24, driven in a counter-clockwise direction and preferably arranged in angular relation as shown in Figs. 3 and 4 operate as scoops for carrying the grain rapidly for projection against the screen forming the drum 12. As the blades revolve counter-clockwise, the angle of the blade causes the grain to be picked up and moved away from the screen, by the "scraping-up" action while the centrifugal force on the grain due to it being rotated around in the cylinder causes it to be impinged on the screen. The net result is a bouncing or rolling (or both), of the grain on the screen. There is less power consumed when the blade revolves counterclockwise because of this "scraping-up" action which keeps the grain from packing up near the outer portion of the screen, which would be the case if the blades were revolved clockwise. Thus it will be seen that by the peculiar angle arrangement of the blades with reference to the drive shaft, hub, or cylinder, in which the parts operate, lower power consumption and clogging is prevented. As pointed out the counter-clockwise direction of travel of the blade facilitates these functions and operations. Due to the twisted arrangement of the outer fingers of the blades the grain is given a swirling or spiral movement which results in a rolling of the grain and a maximum cleaning action. The cleaning action can be facilitated by adjustment or arrangement of the fingers at varying angles with respect to the blade body. The changes in the shape of the blade fingers will be determined by the condition of the material, or the nature of the material being treated.

What I claim is:

1. A grain treating apparatus including a supporting frame, a casing mounted on the frame provided with a grain inlet opening and a grain outlet opening arranged at opposite ends, a perforated cylinder in the casing receiving grain from the inlet opening and discharging same to the outlet opening, a driven shaft extending through said cylinder, adjustably arranged scouring blades on said shaft in said cylinder, each blade including a body portion and a plurality of fingers, certain of said fingers being located between each end finger and an intermediate finger, and being bent rearwardly of the direction of rotation to lie substantially at right angles with respect to the plane of the beater blade.

2. A grain treating apparatus including a supporting frame, a casing mounted on the frame provided with a gain inlet opening and a grain outlet opening, a perforated cylinder arranged in the casing for receiving the grain from the inlet opening and discharging the same to the outlet opening, a driven shaft extending through the cylinder, a plurality of hubs fixed on said shaft, a plurality of arms radiating from said shaft, scouring blades on the outer end portions of said arms, each blade including a body portion and a plurality of radiating fingers, the end fingers of each blade being twisted at an angle to the plane of the blade, intermediate fingers arranged in a common plane with said blade and another intermediate finger being inclined rearwardly with respect to the path of its movement.

3. A grain treating apparatus including a casing provided with a grain inlet opening and a grain outlet opening, a cylinder arranged in the casing for receiving grain from the inlet opening and discharging the same to the outlet opening, a driven shaft extending through said cylinder, a plurality of axially arranged arms extending from said shaft and tangentially with respect thereto, the outer ends of said arms being bent in the direction of their travel, and blades secured to the ends of said arms, each blade including a body portion and a plurality of fingers, certain of said fingers being located between each end finger and an intermediate finger and being bent rearwardly of the direction of rotation to lie substantially at right angles with respect to the plane of the beater blade, and said end finger being twisted axially at an angle to the plane of the blade.

4. A grain treating apparatus including a supporting frame, a casing mounted on the frame provided with a grain inlet opening and a grain outlet opening, a perforated cylinder arranged in the casing for receiving the grain from the inlet opening and discharging the same to the outlet opening, a driven shaft extending through the cylinder, a plurality of hubs fixed on said shaft, a plurality of arms radiating from said hubs, scouring blades secured to the outer end portions of said arms including a plurality of radiating fingers, some of which extend in a common plane with said blade body, the end fingers of each blade being twisted at an angle to the plane of the blade body and an intermediate finger being inclined rearwardly with respect to its path of movement whereby the grain is caused to have a swirling movement.

TIMOTHY D. SHANKEL.